United States Patent [19]
Shinohara

[11] 3,837,216
[45] Sept. 24, 1974

[54] METHOD AND APPARATUS FOR MEASURING THE CONCENTRATION OF SOLID CONTAMINANTS CONTAINED IN LIQUIDS
[75] Inventor: Yoshimi Shinohara, Fuji, Japan
[73] Assignee: Shinohara Seiki Kabushiki Kaisha
[22] Filed: Apr. 30, 1973
[21] Appl. No.: 355,478

[52] U.S. Cl. .................................. 73/61 R, 210/86
[51] Int. Cl. ............................................ G01n 15/00
[58] Field of Search ........ 73/61 R, 63; 210/86, 104, 210/111, 387

[56] References Cited
UNITED STATES PATENTS
| 2,442,888 | 6/1948 | Cram | 73/63 |
| 2,615,329 | 10/1952 | Witham | 73/63 |
| 2,805,773 | 9/1957 | Mecklin et al. | 210/104 |
| 2,826,061 | 3/1958 | Forsten et al. | 73/63 |
| 3,086,905 | 4/1963 | Richardson | 73/63 X |
| 3,245,536 | 4/1966 | McKay | 210/77 |

FOREIGN PATENTS OR APPLICATIONS
805,309   8/1936   France .............. 210/387

Primary Examiner—Richard C. Queisser
Assistant Examiner—Joseph W. Roskos
Attorney, Agent, or Firm—Steinberg & Blake

[57] ABSTRACT

Liquid containing a solid contaminant is filtered by a filtering cylinder rotated in a container. The number of rotations of the filtering cylinder is controlled in accordance with the liquid level in the container. As the number of revolutions of the filtering cylinder is proportional to the concentration of the contaminant the speed of the filtering cylinder is detected to determine the concentration.

13 Claims, 6 Drawing Figures 3,837,216

METHOD AND APPARATUS FOR MEASURING THE CONCENTRATION OF SOLID CONTAMINANTS CONTAINED IN LIQUIDS

BACKGROUND OF THE INVENTION

This invention relates to a method and apparatus for measuring the concentration of solid contaminants the dust floating or suspending in liquids.

Waste liquids discharged from various types of factories present a large problem of polution or public hazard. For this reason, it is a recent trend to improve the control of the concentration of the contaminant (including any solid matter causing public hazard) that is floating or suspending in water discharged to rivers, recovering for reuse of valuable components contained in the discharged water, and the control of the concentration of the contaminant floating in liquid. Heretobefore, the measurement of the concentration was done by an optical measuring method. However, such method of measurement uses the light transmitted through or scattered by the substance contained in liquid so that the result of measurement is greatly influenced by the colour of the liquid or additives contained in the liquid and such method requires skilled and complicated operation, maintenance and repair. Accordingly, any satisfactory continuous measuring device has not yet been developed. In addition, optical elements such as lenses, glass windows and filters are heavily contaminated and are often damaged.

SUMMARY OF THE INVENTION

Accordingly, it is an object of this invention to provide a novel method and apparatus for continuously measuring the concentration of contaminants floating or suspending in liquid without using any optical element.

Another object of this invention is to provide a novel method and apparatus for continuously measuring the concentration of solid contaminants contained in liquid without being affected by the colour of the liquid and the additives contained in the liquid.

Still another object of this invention is to provide a novel method and apparatus for continuously measuring the concentration of solid contaminants contained in liquids, which are easy to operate, inspect and maintain.

In apparatus comprising a container supplied at a constant rate with a liquid containing a solid contaminant, a filtering or perforated cylinder rotated in the liquid in the container such that the solid contaminant deposits on the peripheral surface of the filtering cylinder, means to remove the contaminant deposited on the periphery of the filtering cylinder, and means to discharge to the outside the filtrate accumulated in the filtering cylinder, when the concentration of the solid contaminant increases, the filtering efficiency is decreased, whereby the quantity of the filtrate accumulated in the filtering cylinder decreases with the result that the liquid level in the container rises.

The invention contemplates unique utilization of this fact. More particularly, in order to maintain the liquid level in the container at a constant value, it is necessary to increase the number of revolutions of the filtering cylinder for increasing the filtering efficiency thereof. Thus, the concentration of the solid contaminant in the liquid contained in the container is proportional to the number of revolutions of the filtering cylinder. Accordingly, it is possible to measure the concentration of the solid contaminant by measuring the rotational speed of the filtering cylinder or a driving device therefor.

According to one aspect of this invention, there is provided a method of measuring the concentration of a solid substance or contaminant floating or suspending in a liquid, the method comprising the steps of admitting the liquid into a container at a constant rate, rotating a filtering cylinder in the liquid contained in the cylinder thereby causing the substance to deposit on the periphery of the filtering cylinder, continuously removing a layer of the deposited substance from the filtering cylinder, discharging to the outside the filtrate accumulated in the filtering cylinder, controlling the rotational speed of a driving device of the filtering cylinder in accordance with the liquid level in the container, and detecting the rotational speed of the filtering cylinder to determine the concentraton of the substance contained in the liquid.

In accordance with another aspect of the invention, there is provided apparatus for measuring the concentration of a substance floating or suspending in a liquid, the apparatus comprising a container, means to admit the liquid into the container at a constant rate, a filtering cylinder rotated in the liquid contained in the container, means to discharge to the outside the filtrate accumulated in the filtering cylinder, a filter web, means to cause the filter web to travel in the container about the periphery of the filtering cylinder thereby depositing the substance upon the filter web, means to detect the liquid level in the the container, a speed detector to detect the speed of the driving device, and an indicator responsive to the output of the speed detector for indicating the concentration of the substance contained in the liquid.

According to a further aspect of this invention there is provided apparatus for measuring the concentration of a substance floating or suspending in a liquid, the apparatus comprising a container, means to admit the liquid into the container at a constant rate, a filtering cylinder rotated in the liquid contained in the container thereby causing the substance to deposit on the periphery of the filtering cylinder, means to discharge to the outside the filtrate accumulated in the filtering cylinder, a peel off roller disposed close to the filtering cylinder for removing the substance deposited on the periphery of the filtering cylinder, means to detect the liquid level in the container, means controlled by the liquid level detector for rotating the drive device of the filtering cylinder at a speed proportional to the liquid level in the container, a speed detector to detect the speed of the driving device, and an indicator responsive to the output of the speed detector for indicating the concentration of the substance contained in the liquid.

BRIEF DESCRIPTION OF THE DRAWINGS

Further objects and advantages of the invention will be more fully understood from the following detailed description taken in conjunction with the accompanying drawings, in which.

DESCRIPTION OF THE PREFERRED EMBODIMENTS

Figure 1:
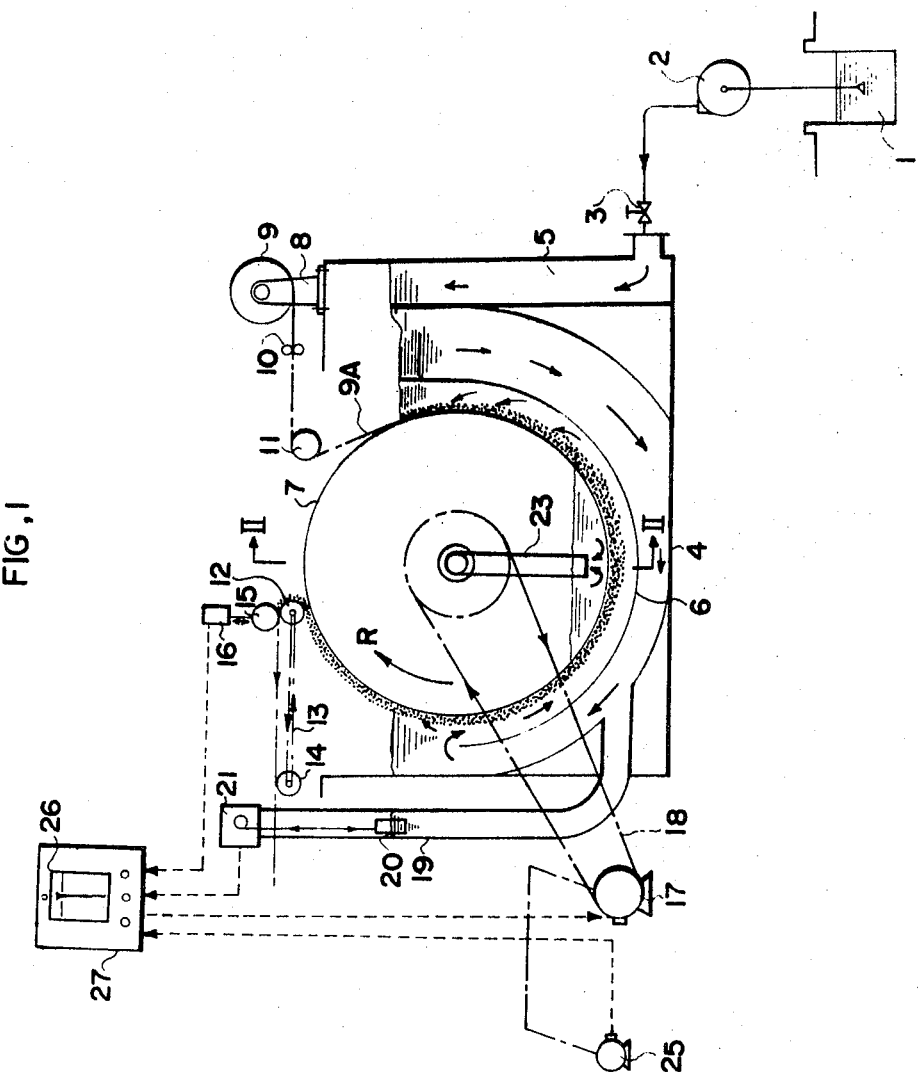
FIG. 1 is a diagrammatic representation of measuring apparatus embodying the invention.

With reference now to FIG. 1 of the accompanying drawing, a liquid 1 to be measured such as factory waste liquid is supplied into a container 4 by a constant volume pump 2 through a valve 3 and an inlet passage 5 formed on one side of the container 4. A semicircular barrier 6 is provided in the container to surround the lower portion of a perforated or filtering cylinder 7 whereby the liquid admitted into the container 4 flows through a passage outside of the barrier 6 as shown by arrows and thence flows through a space between the barrier 6 and the perforated cylinder 7 in the opposite direction. A web of a filter paper 9A is payed out from a roll 9 carried by a support 8 which is secured on the upper surface of the container 4 and passes around the periphery of the perforated filtering cylinder via pinch rollers 10 and a guide roller 11 so that the solid contaminant floating or suspending in the liquid adheres on the surface of the filter web 9A as it is moved with the rotation of the perforated cylinder. The exit end of the filter web 9A passes around a guide roller 12 and is pulled by a driving roller 14 which is driven by the guide roller 12 through a belt 13. In this manner, the solid contaminant contained in the liquid is continuously removed and the thickness of the filter web deposited with the contaminant is measured by a thickness detector 16 including a measuring roller 15.

The perforated cylinder 7 is rotated at a variable speed in the clockwise direction as shown by an arrow R by means of a driving device 17 through a belt 18, for example. The driving device 17 may be an electric motor or an internal combustion engine provided that it can be operated at a variable speed. A speed command signal for the driving device 17 is provided by a liquid level detector 21 which is constructed to detect the liquid level by means of a float 20 floating on the liquid in a vertical column 19 communicated with the interior of the container 4 at the bottom of the column 19.

Figure 2:
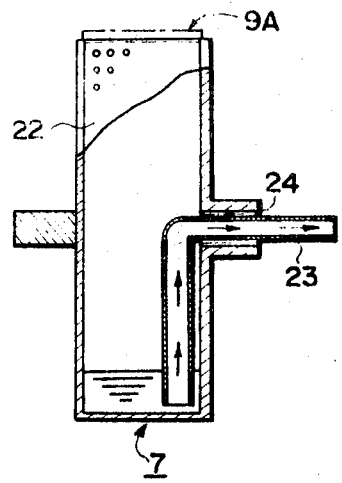
FIG. 2 shows a sectional view taken along a line II — II in FIG. 1.

The perforated cylinder 7 has a cross-sectional configuration as shown in FIG. 2. Thus, a perforated plate 22 or a metal wire net is mounted on the periphery of the cylinder 7. The filter web 9A is disposed to wrap about the portion of the periphery of the cylinder 7 which is normally immersed in the liquid so as to be conveyed in the direction of rotation of the perforated cylinder 7.

The liquid filtered by the filter web 9A and the perforated cylinder 7 is collected at the bottom thereof and is discharged to the outside through a discharge pipe 23 extending through the hollow shaft of the cylinder and supported by a bearing 24.

With this construction, as the concentration of the contaminant contained in the liquid increases, the efficiency of the filtering action of the filter web 9A and perforated cylinder decreases thereby rising the liquid level in the container 4. To avoide the rise of the liquid level beyond a predetermined level, under the control of a command signal provided by the liquid level detector 16, the speed of the driving device 17 is increased to rotate the perforated cylinder 7 at a higher speed, thus increasing the filtering efficiency to restore the original liquid level. It is necessary to increase the rotational speed of the driving device 17 as the concentration of the contaminant contained in the liquid increases. In other words the rotational speed of the driving device is proportional to the concentration of the concentration contained in the liquid.

According to this invention, a speed detector 25 is coupled to the shaft of the driving device 17 and the output of the speed detector 25 is applied to an indicator 26 to measure the concentration of the contaminant. If desired, the output of the speed detector 25 may be modified by the output from the thickness detector 21 to assure more accurate measurement of the concentration of the contaminant. These operations are performed electrically by means mounted on a control panel 27. The indicator 26 provides not only a visual display but also an output signal for process control apparatus.

Figure 3:
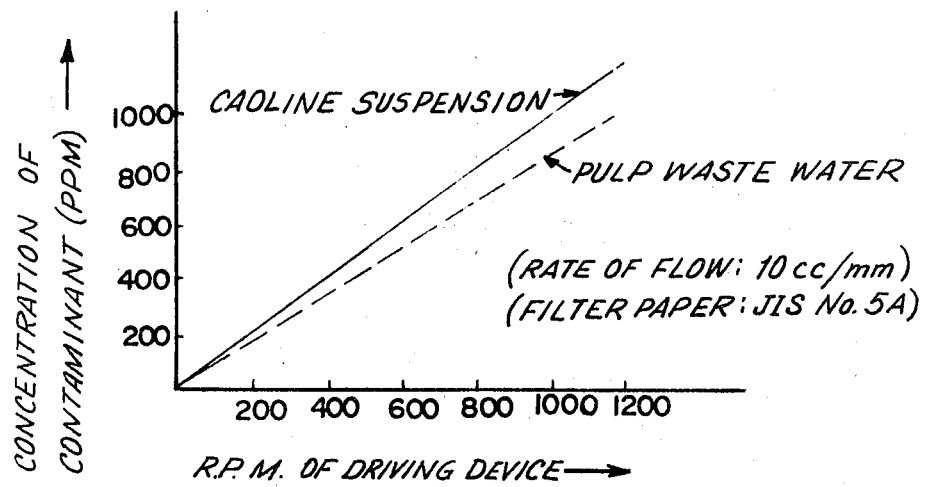
FIG. 3 is a graph showing the relationship between the concentration of the contaminant floating in liquid and the number of revolutions of a driving device.
Figure 4:
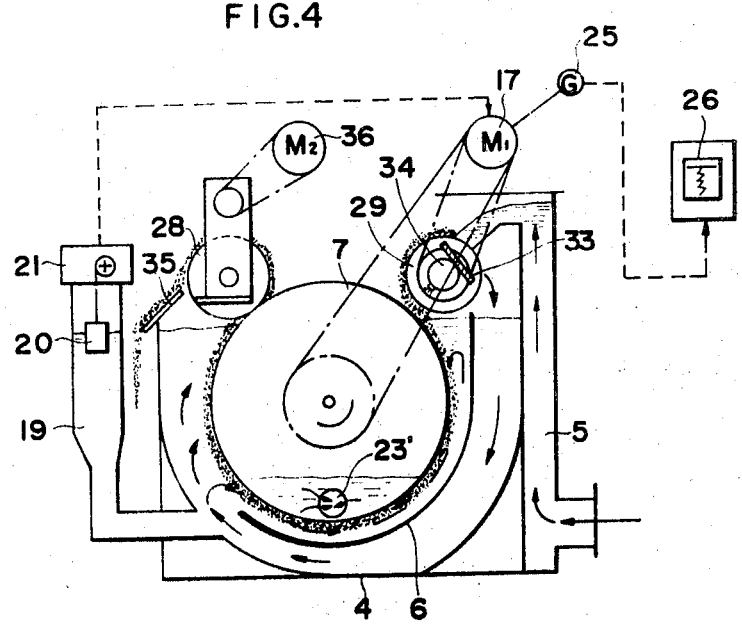
FIg. 4 is a diagrammatic representation of a modified embodiment of this invention.
Figure 5:
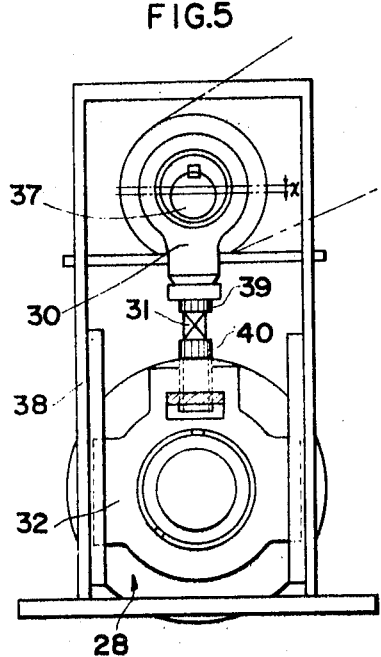
FIG. 5 is an enlarged view showing a separation roller provided with a vibrating and percussion mechanism.
Figure 6:
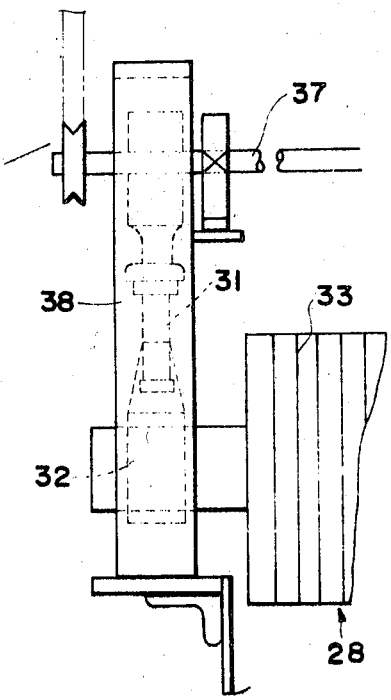
FIG. 6 is a side view of the separation roller showing the surface configuration thereof.

FIG. 3 shows a graph illustrating the relationship between the concentrations of the solid contaminant contained in a pulp waste liquid and a kaoline suspension, and the number of revolutions of the driving device. The curves are straight showing that the concentration of the contaminant and the number of revolutions are proportional. These curves were obtained by feeding the liquid to be measured at a rate of 10 cc/min and by using a web of a filter paper prepared in accordance with the provision of JIS No. 5.

Where the particle size of the contaminant contained in the liquid is relatively large as in pulp waste liquid, it is possible to eliminate the filter web and to cause the contaminant to directly depost on the periphery of the perforated cylinder 7, as shown in FIG. 4. The layer of the contaminant accumulated on the periphery of the perforated cylinder 7 is removed by a peel off roller 28. In this modification too, it is possible to detect the rotational speed of the driving device 17 which drives the perforated cylinder 7 by means of a speed detector 25 so as to indicate the concentration of the contaminant by an indicator 26. This modified embodiment can also give satisfactory result of measurement.

Where the measuring device shown in FIG. 4 and not provided with a filter web is used to measure the concentration of liquids containing fine particles of solid or pulp such as muddy deposit or sludge which is difficult to filter the perforations of the perforated cylinder are liable to be clogged. When clogged in this manner, the liquid can not pass through the cylinder from the container whereby the liquid level therein rises to cause an overflow. Under these condition, it is necessary to stop the supply of the liquid to the container. To eliminate this difficulty, in the modified embodiment of this invention shown in FIG. 4, there are provided a separating filter 29 located above the perforated cylinder 7 on one side thereof and a peel off roller 28 provided with a vibrating and percussion mechanism and arranged to engage the periphery of the perforated cylinder 7 on the opposite side thereof. As shown in FIGS. 5 and 6 the vibrating and percussion mechanism comprises a crank arm 30 eccentrically mounted on a drive shaft 37 and a bearing 32 supporting the peel off roller 28 and removably connected with the crank arm 30 by a bolt 31 having an adjustable length. The peel off roller 28 is provided with peripheral grooves for improving the efficiency of the peel off operation.

The modified embodiment shown in FIG. 4 operates as follows. The liquid to be measured is firstly conveyed to the separating filter 29 via conduit 5 and large particles and fine particles of the solid contaminant contained in the liquid are separated by the action of the separating filter 29. More particularly, such fine solid substances as short fiber pulp pass through the separating filter 29 and are fed into the container as shown by arrow A by the action of a deflector 33 whereas such large solid substances as long fibers or large particles do not pass into the interior of the separating filter 29 but are carried thereby directly to the periphery of perforated cylinder 7. As above described, since the periphery of the cylinder 7 is perforated or provided with a metal wire net, the long fibers or large solid particles are filtered by the perforated cylinder 7 and the filtrate is collected at the bottom in the perforated cylinder. The filtrate is then discharged through the discharge opening 23' of a discharge pipe to be used again or discarded. A water sprinkler 34 is disposed in the separating cylinder 29 to prevent the clogging of the perforations thereof. Short pulp or fine solids separated by the separating filter 29 flow through a passage outside of barrier 6 and when they are discharged from this passage at the lefthand end of the barrier 6 as viewed in FIG. 4, they float on the upper surface of the liquid where they adhere to the layer of large fibers formed on the periphery of the perforated cylinder. Also oils or black liquid contained in the liquid to be measured adhere to said layer and are removed. The metal wire net of the perforated cylinder may be of relatively large mesh. But the large fibers or large solid particles that have been carried by the filtering filter 29 form a layer thereof about the peripheral surface of the perforated cylinder, then short fibers and fine solids and finally oil and black liquid adhere to said layer, thereby forming three superposed layers on the peripheral surface of the perforated cylinder. As the quantity deposited increases, the filtering capability of the perforated cylinder decreases whereby the liquid level in the container 4 rises. The liquid level is detected in a manner to be described later to increase the number of revolutions of the perforated cylinder 7 so as to maintain the liquid level at a constant level. Where the liquid level is maintained above the center of the perforated cylinder 7, it is possible to cause short fibers, fine solid particles, oil and black liquid to readily adhere to the peripheral surface of the perforated cylinder 7. On the other hand, where the liquid level is maintained below the center, only relatively long fibers and large solid particles are caused to adhere.

The layer of pulp of the like adhered to the periphery of the perforated cylinder 7 is transferred onto the periphery of the peel off roller 28 which is positioned above the liquid level. Finally the layer is separated from the peel off roller 38 by means of a doctor knife 35 to be recovered. The portion of the peripheral surface of the perforated cylinder 7 from which the deposited layer of pulp or the like has been removed enters again into the liquid as the cylinder 7 is rotated. As above described, long fiber pulp or large solid particles adhere to the bared surface of the perforated cylinder to repeat the filtering cycle.

As above described the crank arm 30 is rotatably mounted on one end of shaft 37 driven by an electric motor 36 with an eccentricity of $x$, so that as the shaft 37 is rotated the crank arm 30 reciprocates in a frame 38 in the vertical direction with a stroke $x$. The connecting bolt 31 which interconnects the lower end of crank arm 30 and the bearing 32 of the peel off roller 28 is provided with stroke adjusting nuts 39 and 40 on its opposite ends. The bearing 32 is guided by frame 38 to move in the vertical direction. Accordingly, as shaft 37 is rotated, the bearing 32 is reciprocated in the vertical direction through crank arm 30 thereby imparting a periodic vibration and percussion movements to the peel off roller 38. The degree of vibration and percussion is adjusted in accordance with the characteristic of the material to be peeled off so as to determine the period of one cycle consisting of contacting and noncontacting periods. By providing the vibrating mechanism for the peel off roller 28, the dehydation and peel off action thereof can be improved. In other words, the dehydration and peeling off of the materials which are difficult to filter such as muddy deposit or sludge, fine pulp, black liquid and oil are performed efficiently. Materials having a large specific gravity can be treated similarly. This construction can also prevent the clogging of the perforated cylinder 7, thus increasing the life thereof and eliminating the water sprinkler.

According to this invention, in addition to the vibrating and percussion mechanism described above, the peripheral surface of the peel off roller 28 is provided with a plurality of circumferential grooves 33, as shown in FIG. 6. Instead of using parallel grooves continuous helical grooves can also be provided. By the action of the grooves, the substance to be removed is firstly compressed and dehydrated on the peripheral surface of the peel off roller. Concurrently therewith the substance is forced in the grooved so that at the instant when the peel off roller 28 is disengaged from the perforated cylinder 7 by the action of the vibrating and percussion mechanism a partial vacuum is created in the grooves to attract and remove the layer of the substance away from the surface of the perforated cylinder. The depth, width and pitch of the grooves are suitably selected in accordance with the characteristic of the substance to be peeled off.

As above described, the method and apparatus of this invention do not use any optical element so that it is possible to directly and continuously measure the concentration of the solid contaminant contained in liquid without being affected by the colour of the liquid to be measured or the presence of additives. Moreover, the measuring apparatus of this invention has a long life and easy to maintain.

Moreover, as a filter web is used in the novel measuring apparatus, it is possible to continuously measure the concentration of any form of solids contained in the liquid. Further, even in the measuring apparatus not utilizing the filter web, since the number of revolutions of the perforated cylinder is controlled in accordance with the variation in the liquid level and since the peel off roller is provided with a vibrating and percussion mechanism and a plurality of grooves, it is possible to perfectly peel off the layer of the solid contaminant deposited on the surface of the perforated cylinder irrespective of the characteristic of the solid contaminant.

This also prevents the clogging of the perforated cylinder thereby assuring continuous measurement.

This invention can be applied to a variety of fields including the measurement and control of the concentration of the solid contaminant floating or suspending in liquids, supervision of valuable substances in liquids, supervision of the fault of various apparatus included in a processing line, and measurement and control of substances flowing out of the processing line.

What is claimed is:

1. A method of measuring the concentration of a solid substance floating or suspending in a liquid, said method comprising the steps of admitting said liquid into a container at a constant rate, rotating a filtering cylinder in said liquid contained in said container thereby causing said substance to deposit on the periphery of said filtering cylinder, continuously removing a layer of said deposited substance from said filtering cylinder, discharging to the outside the filtrate accumulated in said filtering cylinder, controlling the rotational speed of a driving device of said filtering cylinder in accordance with the liquid level in said container, and detecting the rotational speed of said filtering cylinder to determine the concentration of said substance contained in said liquid.

2. The method according to claim 1 wherein a filter web is admitted into the liquid in said container to pass about the periphery of said filtering cylinder, whereby said substance is caused to deposit on said filter web, and the deposited substance is continuously removed out of said container together with said substance deposited on said filter web.

3. The method according to claim 1 wherein said layer of said substance deposited on said filtering cylinder is continuously peeled off from said filtering cylinder by means of a peel off roller which is rotated in contact with said filtering cylinder at a point above the liquid level in said container, and the peeled off layer of said substance is continuously discharged out of said container.

4. The method according to claim 3 wherein a vibration is imparted to said peel off roller to cause it periodically collide against the peripheral surface of said filtering cylinder thereby continuously peeling off said layer of said deposited substance from said filtering cylinder and said peeled off layer is discharged to the outside of said container.

5. The methd according to claim 3 wherein said peel off roller is provided with a plurality of circumferential grooves and is imparted with a vibrating force so as to force said layer of said deposited substance into said grooves and then attract said layer to remove the same from the periphery of said filtering cylinder, and the removed layer is continuously discharged to the outside of said container.

6. Apparatus for measuring the concentration of a substance floating or suspending in a liquid, said apparatus comprising a container, means to admit said liquid into said container at a constant rate, a filtering cylinder rotated in said liquid contained in the container, means to discharge to the outside the filtrate accumulated in said filtering cylinder, a filter web, means to cause said filter web to travel in said container about the periphery of said filtering cylinder thereby depositing said substance upon said filter web, means to detect the liquid level in said container, means controlled by said liquid level detecting means for rotating the driving device of said filtering cylinder at a speed proportional to the liquid level in said container, a speed detector to detect the speed of said driving device, and an indicator responsive to the output of said speed detector for indicating the concentration of said substance contained in said liquid.

7. The measuring apparatus according to claim 6 which further comprises a thickness detector for detecting the thickness of said filter web on which said substance contained in said liquid has been deposited, and means for modifying the output of said speed detector with the output of said thickness detector.

8. Apparatus for measuring the concentration of a substance floating or suspending in a liquid, said apparatus comprising a container, means to admit said liquid into said container at a constant rate, a filtering cylinder rotated in said liquid thereby causing said substance to deposit on the periphery of said filtering cylinder, means to discharge to the outside the filtrate accumulated in said filtering cylinder, a peel off roller disposed close to said filtering cylinder for removing said substance deposited on the periphery of said filtering cylinder, means to detect the liquid level in said container, means controlled by said liquid level detector for rotating the driving device of said filtering cylinder at a speed proportional to the liquid level in said container, a speed detector to detect the speed of said driving device, and an indicator responsive to the output of said speed detector for indicating the concentration of said substance contained in said liquid.

9. The measuring apparatus according to claim 8 which further comprises a separating filter located close to said filter cylinder on one side of said container to which said liquid is admitted, a peel off roller located above the liquid level in said container on the opposite side thereof for peeling off a layer of said substance deposited on the periphery of said filtering cylinder, a vibrating and percussion mechanism for vibratory engaging said peel off roller against the periphery of said filtering cylinder, and a crank arm eccentrically mounted on a driving shaft for reciprocating said vibrating and percussion mechanism.

10. The measuring apparatus according to claim 9 wherein said crank arm is connected to said vibrating and percussion mechanism through a connecting bolt of an adjustable length.

11. The measuring apparatus according to claim 9 wherein said peel off roller is provided with a plurality of peripheral grooves.

12. The measuring apparatus according to claim 11 wherein said grooves are independent parallel grooves.

13. The measuring apparatus according to claim 11 wherein said grooves comprise helical grooves.

* * * * *